(No Model.)

J. Z. RORABACK.
MECHANICAL MOVEMENT.

No. 449,334. Patented Mar. 31, 1891.

Witnesses:
Chas. E. Gaylord.
Clifford P. White.

Inventor:
John Z. Roraback,
By Dyrenforth & Dyrenforth,
Attys.

THE NORRIS PETERS CO., PHOTO-LITHO., WASHINGTON, D. C.

UNITED STATES PATENT OFFICE.

JOHN Z. RORABACK, OF KANSAS CITY, MISSOURI.

MECHANICAL MOVEMENT.

SPECIFICATION forming part of Letters Patent No. 449,334, dated March 31, 1891.

Application filed August 22, 1890. Serial No. 362,780. (No model.)

*To all whom it may concern:*

Be it known that I, JOHN Z. RORABACK, a citizen of the United States, residing at Kansas City, in the county of Jackson and State of Missouri, have invented a new and useful Improvement in Mechanical Movements, of which the following is a specification.

My invention is in the nature of an improvement in the form of mechanical movements involving a driving-wheel on one center and provided with an eccentric tooth, and a peripherally-notched wheel on another center and turned in the engagement with a notch thereof by the tooth of the driving-wheel.

The object of my improvement is to provide a construction whereby the co-operation of the two wheels shall be such as to permit the notched wheel to be readily turned in one direction by turning the driving-wheel in one direction, but wherein the wheels will interlock or obstruct each other in any attempt to turn them back, and thus prevent such backward movement.

I have especially invented my improved mechanism for use in locks of the nature and for the purpose of the lock shown and described in Letters Patent of the United States No. 352,085, issued to Joseph M. Edgar on the 2d day of November, 1886. It is, however, useful in various other connections, and I do not wish to be understood as limiting its use to any particular connection.

Figure 1:
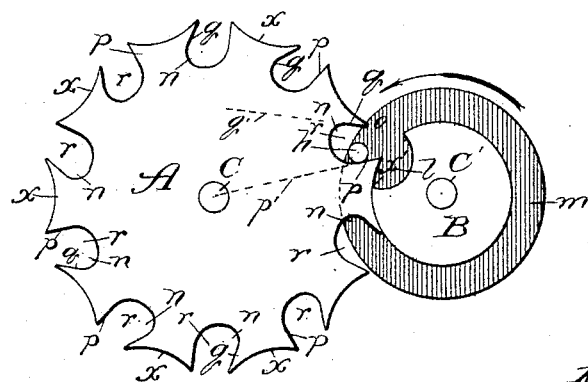
Figure 2:
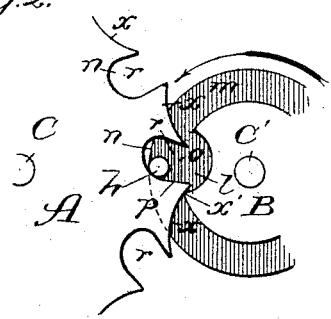
Figure 3:
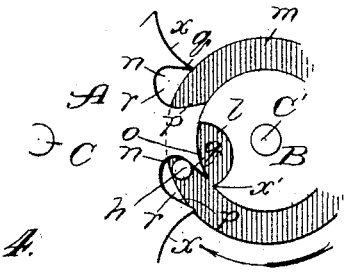
Figure 4:
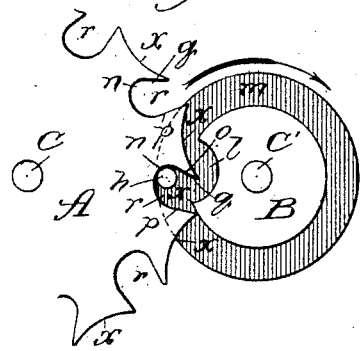

In the accompanying drawings, Figure 1 is a plan view of my improved device; Fig. 2, a broken plan view of the same, indicating its operation in the direction for the purpose of effecting the turning of the notched wheel by the driving-wheel; and Figs. 3 and 4 are similar views indicating, respectively, different relative positions of the two wheels assumed in the attempt to turn them back.

A is a wheel provided with peripheral notches $r$, and having the spaces on the peripheries between the notches depressed, and preferably concave, as shown at $x$, to conform to the circle of the driving-wheel B, hereinafter described. The notches $r$ all involve the same peculiar construction, each having the sides $q$ and $p$, the latter being straight and in radial line with the center C of the wheel, as indicated by the dotted line $p'$ in Fig. 1, and the side $q$, also straight, extending at an acute angle with relation to the side $p$ in the direction of a segment-line on the wheel A, as indicated by the dotted line $q'$, and the base of the recess is curved, as illustrated, being somewhat widened laterally, as shown at $n$, toward the side $q$.

The driving-wheel B, supported at its center C', extends with its periphery against that of the wheel A, and its circumference should conform to the concavity between each pair of adjacent notches $r$. I provide the wheel B with a circumferential base-flange $m$ to guide it in its rotary movement by extending underneath and against the under side of the wheel A. In the periphery of the driving-wheel B is a concave or semicircular recess $l$, and on the flange $m$, to one side of a center $o$, struck in forming the recess $l$, is a stud or tooth $h$.

The operation is as follows: Turning the wheel B in the direction indicated by the arrow in Fig. 1 brings the stud $h$ against the radial side $p$ of a notch $r$ in the wheel A, and continued turning (indicated by Fig. 2) in the same direction takes the stud out of the notch at its radial side, at the same time bearing it against the latter and producing rotation of the notched wheel, while the periphery of the driving-wheel enters the adjacent concavity $x$. Thus each complete revolution of the driving-wheel in one direction effects turning of the wheel A one notch. If the wheel B be turned in the opposite direction, as indicated by the arrow in Fig. 3, the stud $h$, in entering a notch $r$, will pass therein beyond a radial line before it comes in contact with the side $q$ of the notch, as shown in Fig. 3, and when it is brought into such contact and the turning continued as far as may be (the play being but slight) the parts are brought to the relative positions indicated in Fig. 4—namely, the periphery of the wheel A at the outer extremity of the radial side $p$ of a notch projects into the path of the driving-wheel near the extremity $x'$ of its recess $l$, preventing further back turning of both wheels. Obviously if the wheel B be made proportionately larger the peripheral recess and stud $h$ may be multiplied and placed at proper intervals to cause a complete revolution of the driving-wheel B to move the wheel A more than one notch.

What I claim as new, and desire to secure by Letters Patent, is —

1. A new mechanical movement comprising, in combination, a driving-wheel B on one center and having a peripheral recess $l$ and an eccentric stud $h$ and a notched wheel A on another center, extending at its periphery beyond and adapted between its notches to receive the periphery of the driving-wheel, and rotated by the engagement of the stud $l$ with one side of a notch and obstructed against rotation by the engagement of the stud with the opposite side of a notch, substantially as described.

2. A new mechanical movement comprising, in combination, a wheel A on a center C and provided with notches $r$ in its periphery, having corresponding sides in radial lines with the center and the opposite sides extending in the directions of segmental lines on the wheel, the latter being peripherally depressed between the notches, and a driving-wheel B on a center C' and provided with a peripheral recess $l$ and an eccentric stud $h$, supported adjacent to the recess $l$, substantially as described.

3. A new mechanical movement comprising, in combination, a wheel A on a center C and provided with notches $r$ in its periphery, having corresponding sides in radial lines with the center and the opposite sides extending in the directions of segmental lines on the wheel, the latter being peripherally depressed between the notches, and a driving-wheel B on a center C' and provided with a base-flange $m$ extending under the wheel A, and a peripheral recess $l$ and a stud $h$ on the flange $m$ to one side of the center of the recess $l$, substantially as described.

4. A new mechanical movement comprising, in combination, a wheel A on a center C and provided with peripheral notches $r$, having the corresponding radial sides $p$ and the corresponding sides $q$, extending at acute angles to the sides $p$, and concave bases $n$, widening toward the sides $q$, the wheel A being peripherally concaved between the notches, and a driving-wheel B on a center C' and provided with a base-flange $m$, extending under the wheel A, and a semicircular peripheral recess $l$ and a stud $h$ on the flange $m$, to one side of the center $o$, from which the recess $l$ is struck, the whole being constructed and arranged to operate substantially as described.

JOHN Z. RORABACK.

In presence of—
C. C. HANDIBODE,
H. KESSLER.